US006766227B2

(12) United States Patent
Needelman et al.

(10) Patent No.: US 6,766,227 B2
(45) Date of Patent: Jul. 20, 2004

(54) ATTITUDE-ACQUISITION METHODS AND SYSTEMS FOR CONTROLLED SPACECRAFT ATTITUDE

(75) Inventors: David D. Needelman, Torrance, CA (US); Yeong-Wei A. Wu, Rancho Palos Verdes, CA (US); Rongsheng Li, Hacienda Heights, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/300,454

(22) Filed: Nov. 19, 2002

(65) Prior Publication Data

US 2004/0098177 A1 May 20, 2004

(51) Int. Cl.[7] .................................................. G05D 1/00
(52) U.S. Cl. .......................... 701/13; 701/4; 701/222; 342/357.11; 244/158 R; 244/164
(58) Field of Search .......................... 701/13, 226, 222, 701/4, 3; 244/158 R, 164; 342/355, 357.11

(56) References Cited

U.S. PATENT DOCUMENTS

| | | | |
|---|---|---|---|
| 4,837,699 A | * 6/1989 | Smay et al. ................... | 701/13 |
| 5,177,686 A | 1/1993 | Boinghoff et al. .......... | 701/226 |
| 5,745,869 A | 4/1998 | Van Bezooijen et al. ... | 701/222 |
| 6,108,594 A | 8/2000 | Didinsky et al. | |
| 6,470,270 B1 | 10/2002 | Needleman et al. | |
| 2003/0058161 A1 | * 3/2003 | Ring .......................... | 342/355 |

OTHER PUBLICATIONS

Technical Paper, "Compact and Low–Cost Advanced Star Sensor System", available on website global.mitsubishielectric.com, Mitsubishi Electric and Electronics, 5665 Plaza Drive, Cypress, California, USA (Americas Corporate Office).

Samaan et al., "Recursive Mode Star Identification Algorithms", AAS/AIAA Space Flight Mechanics Meeting Santa Barbara, CA Feb. 11–14, 2001, pp. 1–18.

* cited by examiner

Primary Examiner—Yonel Beaulieu
(74) Attorney, Agent, or Firm—Koppel, Jacobs, Patrick & Heybl (57) ABSTRACT

Attitude acquisition methods and systems are provided which reduce the time generally required to acquire spacecraft attitude estimates and enhance the probability of realizing such estimates. The methods and systems receive, over a time span $\Delta t$, successive frames of star-sensor signals that correspond to successive stellar fields-of-view, estimate spacecraft rotation $\Delta r$ throughout at least a portion of the time span $\Delta t$, and, in response to the spacecraft rotation $\Delta r$, process the star-sensor signals into a processed set of star-sensor signals that denote star positions across an expanded field-of-view that exceeds any of the successive fields-of-view. The expanded field-of-view facilitates identification of the stars that generated the processed set of star-sensor signals to thereby acquire an initial attitude estimate.

35 Claims, 5 Drawing Sheets

ATTITUDE-ACQUISITION METHODS AND SYSTEMS FOR CONTROLLED SPACECRAFT ATTITUDE

BACKGROUND OF THE INVENTION

1. Field of the Invention

The present invention relates generally to spacecraft attitude control systems.

2. Description of the Related Art

Spacecraft attitude control is essential because spacecraft must generally be properly oriented to perform their intended service. Communication spacecraft, for example, typically provide communication services for service areas. Accordingly, antenna systems of these spacecraft generate payload beams that form payload footprints on the earth and it is critically important to reduce service error which is any difference between a payload footprint and its respective service area. This can only be accomplished by precise control of a spacecraft's attitude.

In an exemplary star sensor-based attitude determination and control system, a spacecraft's attitude is sensed with star sensors of a stellar attitude determination system and appropriately altered with torque generators that are coupled to the spacecraft's body. Star sensors are complex semiconductor systems which generally include a) an array of light sensitive elements that collect charge in response to incident star light, b) an arrangement of charge-transfer elements that readout the collected charges and c) an output structure that converts the transferred charges to corresponding star-sensor signals.

The collected charges of the array are generally processed into star centroids and each transfer of the processed charges from the star sensor is typically referred to as a data frame. Star-sensor signals are thus provided at a frame rate and denote vertical and horizontal coordinates of stars in the star-sensor's field-of-view. Preferably, the star-sensor signals also denote the magnitudes of these stars.

An estimate of the spacecraft's attitude at the time of a data frame can be formed by identifying the stars that generated the star-sensor signals of that data frame. Identification is generally realized by matching the star-sensor signals to a known set of stars and the known set is typically accessed from stored star catalogs. However, star-sensor fields-of-view are limited (e.g., to horizontal and vertical ranges of 8°) so that attitude determination systems sometimes fail to provide sufficient star-sensor signals to enable an identification. The probability of such failure is increased when the intensity of the star-sensor signals is reduced by maneuvers (e.g., those during transfer orbits) that rotate the spacecraft at a rate that denies sufficient time for the star-sensor light sensitive elements to fully charge in response to incident star light.

SUMMARY OF THE INVENTION

The present invention is directed to attitude acquisition methods and systems which reduce the time generally required to acquire spacecraft attitude estimates and enhance the probability of realizing such estimates.

These goals are realized with methods and systems that, over a time span Δt, receive successive frames of star-sensor signals that correspond to successive stellar fields-of-view, estimate spacecraft rotation Δr throughout at least a portion of the time span Δt, and, in response to the spacecraft rotation Δr, process the star-sensor signals into a processed set of star-sensor signals that denote star positions across an expanded field-of-view that exceeds any of the successive fields-of-view. The expanded field-of-view facilitates identification of the stars that generated the processed set of star-sensor signals to thereby acquire an initial attitude estimate.

The novel features of the invention are set forth with particularity in the appended claims. The invention will be best understood from the following description when read in conjunction with the accompanying drawings.

DETAILED DESCRIPTION OF THE INVENTION

Figure 1:
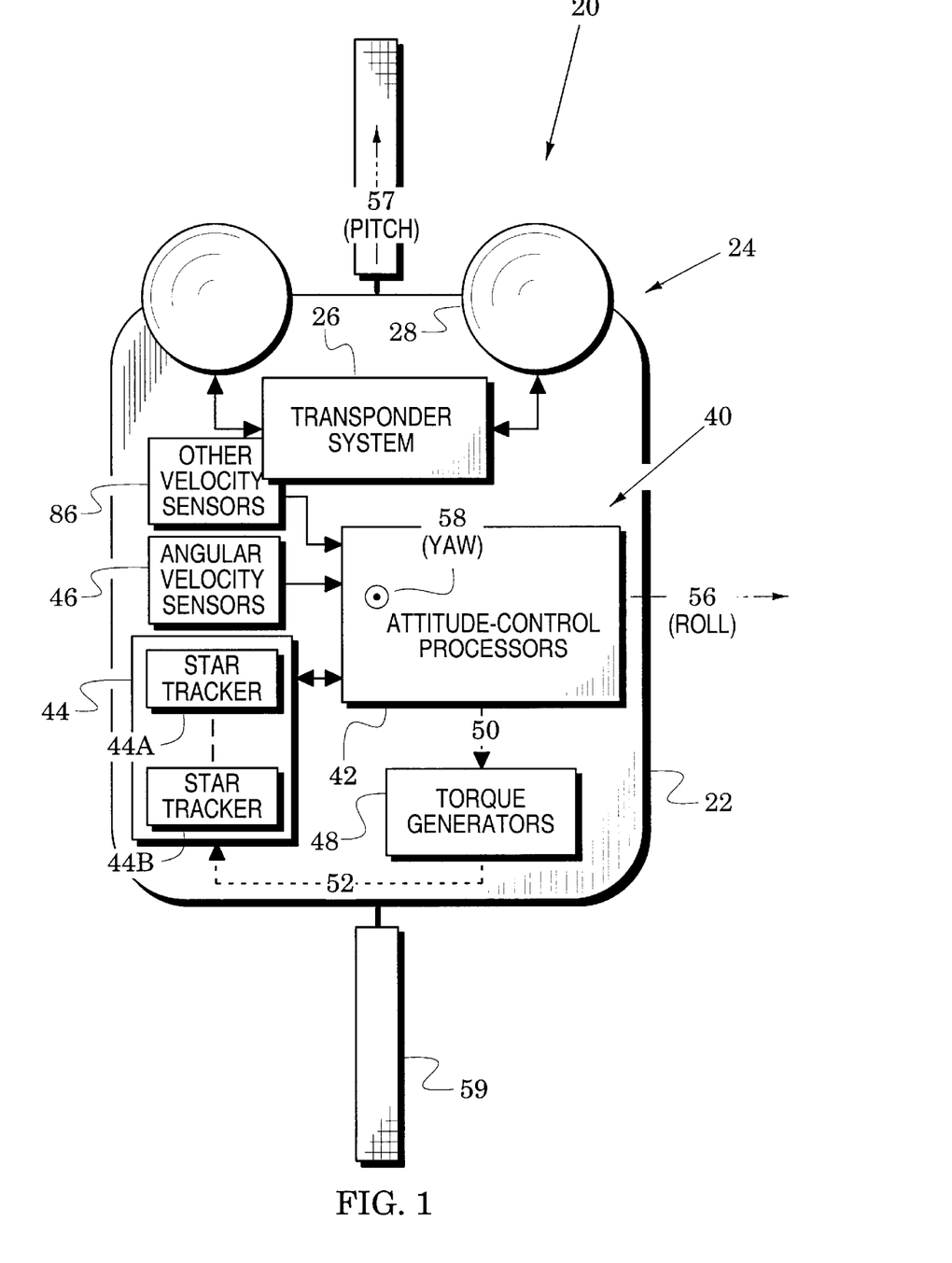
FIG. 1 is a block diagram of a spacecraft of the present invention.
Figure 2:
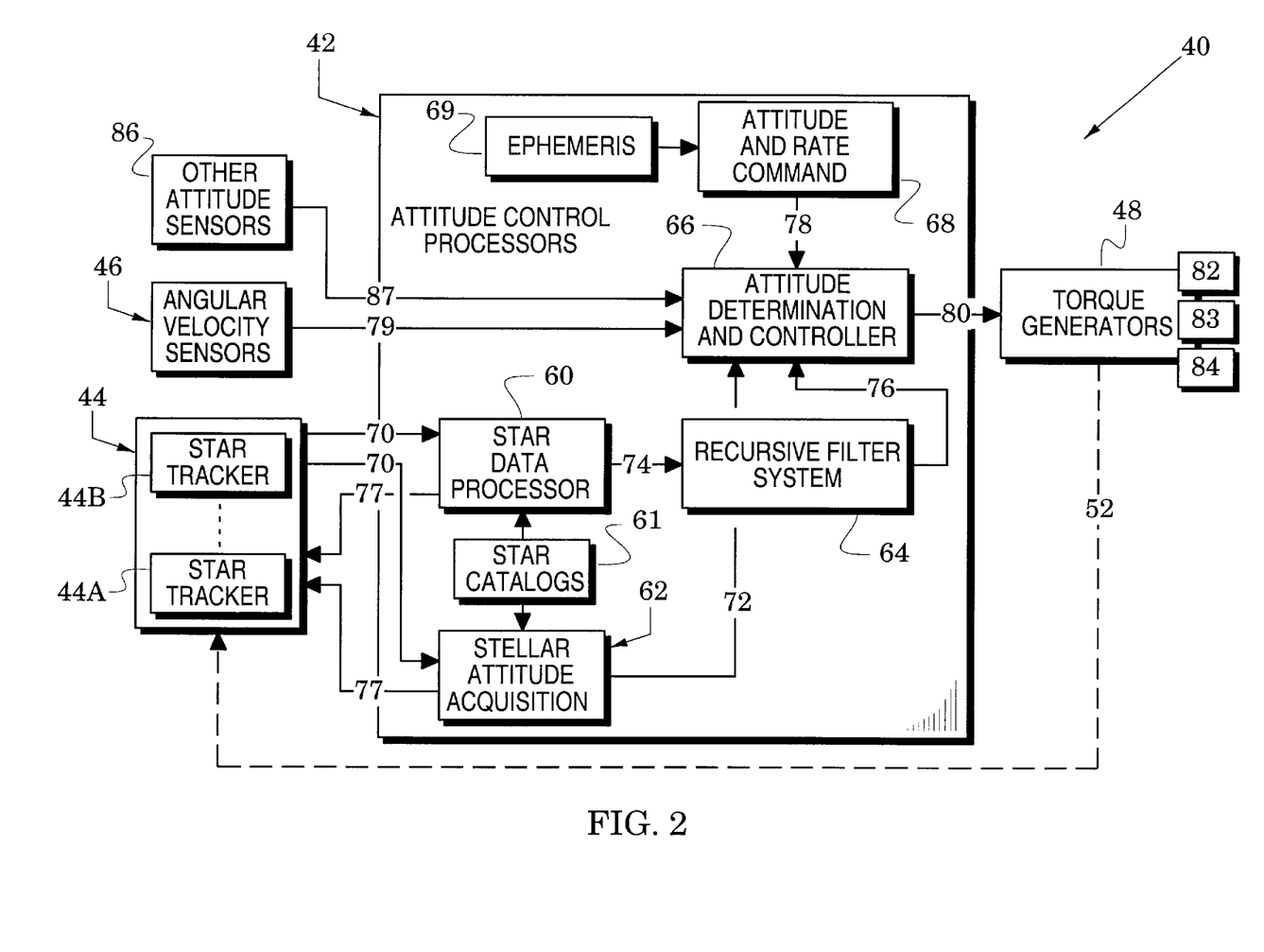
FIG. 2 is a detailed block diagram of an attitude determination and control system in the spacecraft of FIG. 1.

FIGS. 1 and 2 illustrate spacecraft structures of the present invention and FIGS. 3, 4A, 4B, 4C and 5 illustrate methods that can be practiced with these structures to acquire and control spacecraft attitudes. In particular, the methods process star-sensor signals that correspond to successive star-sensor fields-of-view into a processed set of star-sensor signals that denote star positions across an expanded field-of-view that exceeds any of the successive star-sensor fields-of-view. These structures and methods reduce the time to acquire spacecraft attitude and enhance the probability of successful acquisition as will become apparent in the following description.

FIG. 1 shows a spacecraft 20 which has a body 22 that carries an exemplary service system in the form, for example, of a communication system 24. This system provides services (e.g., communication services) to a service area on the earth with a transponder system 26 that interfaces with antennas 28. This service can only be effected if the spacecraft is controlled to have a service attitude.

Accordingly, the body 22 also carries an attitude determination and control system 40 which comprises attitude-control processors 42, a star sensor system 44 that includes at least one star sensor, angular velocity sensors 46 and torque generators 48. In response to attitude sense signals from the star sensor system 44 and the angular velocity sensors 46, the attitude-control processors generate control signals 50.

In response to the control signals, the torque generators 48 induce torques in the body 22 which cause it to assume a commanded attitude (e.g., the spacecraft's service attitude). Because their torques alter the attitude of the body 22, the torque generators effectively generate a feedback path 52 that alters the attitude sense signals of the star sensor system 44 and the angular velocity sensors 46.

Attitude of the spacecraft 20 can be defined with reference to a body-centered coordinate system that comprises a roll axis 56, a pitch axis 57 and a yaw axis 58 (directed towards the viewer). The systems of the spacecraft 20 are preferably powered with currents that are generated, for example, by at least one solar panel 59.

As shown in FIG. 2, the attitude-control processors 42 of the attitude determination and control system 40 comprise a star data processor 60, at least one star catalog 61, a stellar attitude acquisition system 62, a recursive filter system 64, an attitude determination and controller 66, an attitude and rate command section 68 and an ephemeris determination system 69.

The stellar attitude acquisition system 62 receives star sensor signals 70 from the star sensor system 44 and accesses data from the star catalogs 61 to thereby identify the stars that generated the star-sensor signals 70. If this identification is successful, the stellar attitude acquisition system 62 provides an initial attitude estimate 72 to the attitude determination and control system 66.

The star data processor 60 also receives star sensor signals 70 from the star sensor system 44 and has access to data from the star catalogs 61. Star measurement signals 74 from the star data processor 60 are processed by the recursive filter system 64 into subsequent attitude estimates 76 which are then provided to the attitude determination and controller 66. The star data processor 60 and the stellar attitude acquisition system 62 couple tracked-star commands 77 to the star sensor system 44 to thereby control which stars are tracked by the star sensors.

With access to ephemeris data 69 (e.g., earth and sun locations), the attitude and rate command 68 provides a commanded attitude 78 to the attitude determination and controller 66 which also receives rate signals 79 from the angular velocity sensors 46. In response, the attitude determination and controller 66 delivers torque command signals 80 to the torque generators 48 (e.g., thrusters 82, momentum wheels 83 and magnetic torquers 84). The resultant torque induces rotation of the spacecraft body (22 in FIG. 1) which forms an effective feedback rotation signal 52 that is sensed by the star sensor system 44, angular velocity sensors 46 and any other attitude sensors 86 (e.g., sun sensor) that provide other sense signals 87 to the attitude determination and controller 66 (the other attitude sensors 86 are also shown in FIG. 1).

Figure 3:
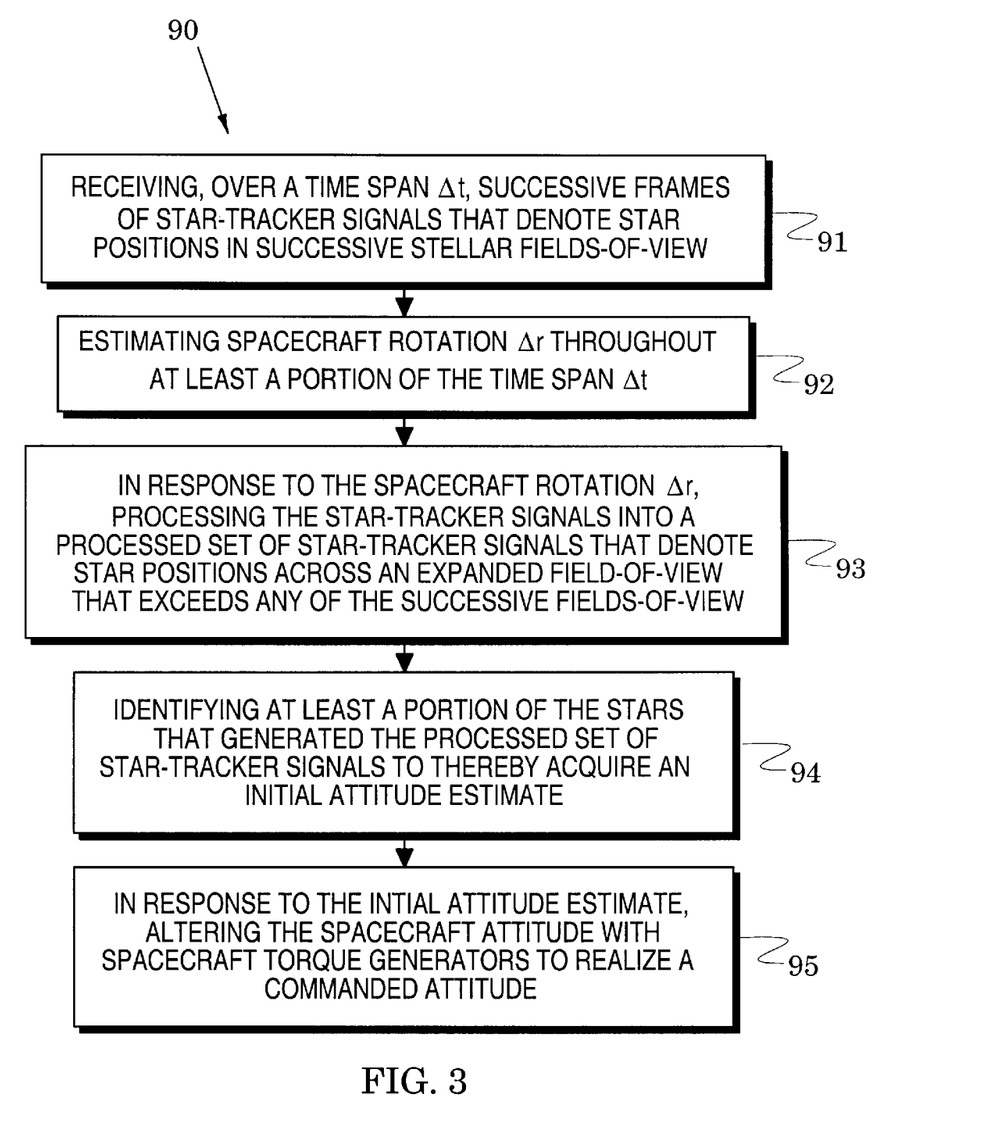
FIG. 3 is a flow chart which illustrates processes in an attitude acquisition and control method of the present invention that is practiced with the spacecraft of FIG. 1.

The flow chart 90 of FIG. 3 illustrates process steps 91–95 in a method embodiment of the invention which acquires and controls the attitude of the spacecraft 20 of FIG. 1. In process step 91, successive frames of star-sensor signals that denote star positions in successive stellar fields-of-view are received (from a star sensor) over a time span Δt.

Figures 4A, 4B, 4C:
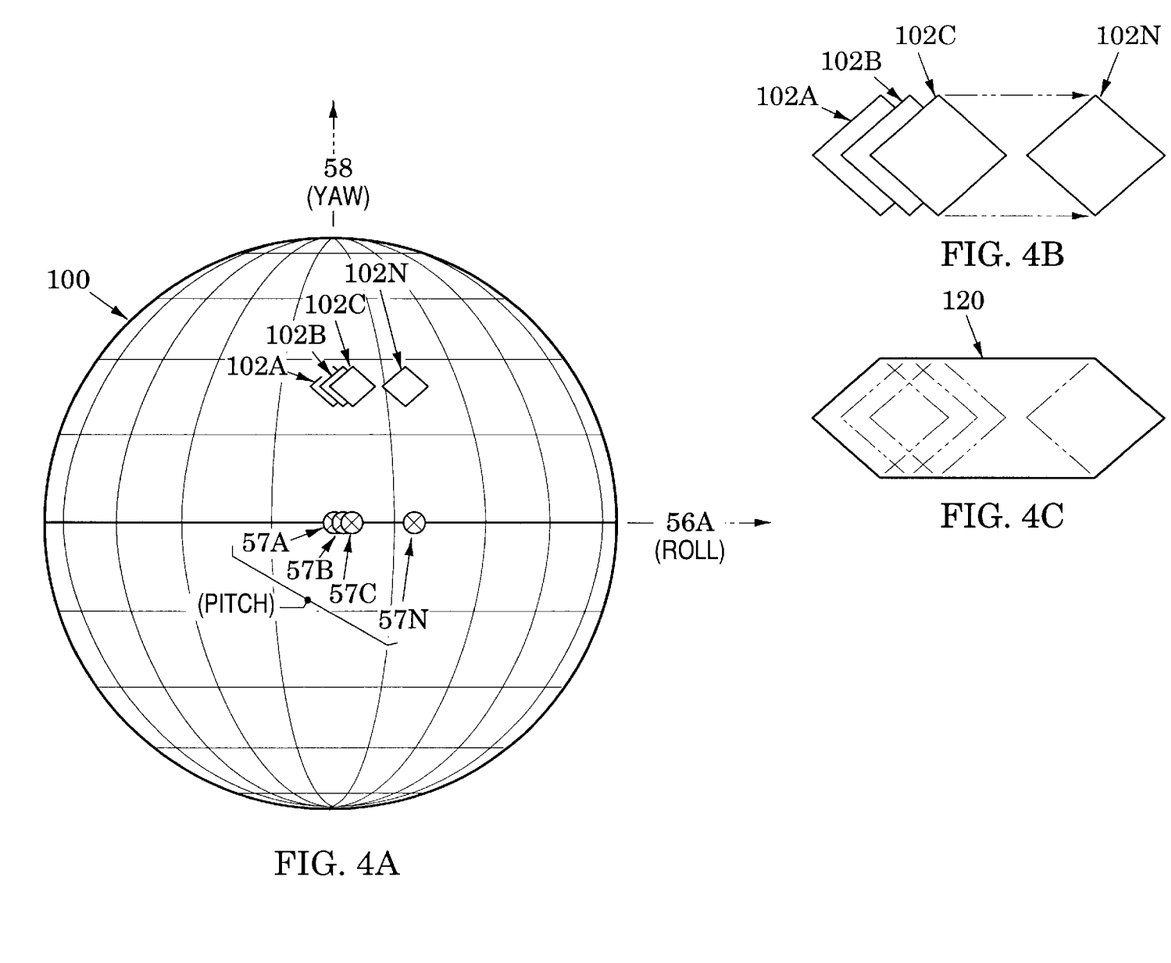
FIG. 4A illustrates fields-of-view of a star sensor of the spacecraft of FIG. 1 as projected onto a spherical coordinate system that is centered on the spacecraft.
FIG. 4B is an enlarged view of the fields-of-view of FIG. 4A.
FIG. 4C illustrates an expanded star-sensor field-of-view that is formed from the fields-of-view of FIG. 4B.

This step is exemplified in FIG. 4A which shows a spherical coordinate system 100 that is centered on the spacecraft (20 in FIG. 1) and also shows the spacecraft roll, pitch and yaw axes 56, 57 and 58 (wherein the pitch axis 57 is directed away from the viewer). For illustrative purposes, it is assumed in FIG. 4A that the spacecraft is rotating about its yaw axis 58 at an exemplary rate of 0.05°/second and that the field-of-view 102A represents the field-of-view at a time $t_1$ of one of the star sensors (e.g., star sensor 44A) of FIG. 1 that is angled as shown in the figure and that the field-of-view is projected onto the spherical coordinate system 100.

For simplicity of illustration, FIG. 4A only shows additional successive fields-of-view 102B and 102C at successive times $t_2$ and $t_3$ which occur at the ends of successive intervals of one minute and a successive field-of-view 102N at a time $t_n$ that is six minutes after time $t_1$ because illustrating additional successive fields-of-view at shorter successive times would diminish the clarity of FIG. 4. Corresponding positions of the pitch axis are indicated as 57A–57N. The position of the roll axis at time $t_1$ is shown as 56A; later portions are not shown.

Figure 5:
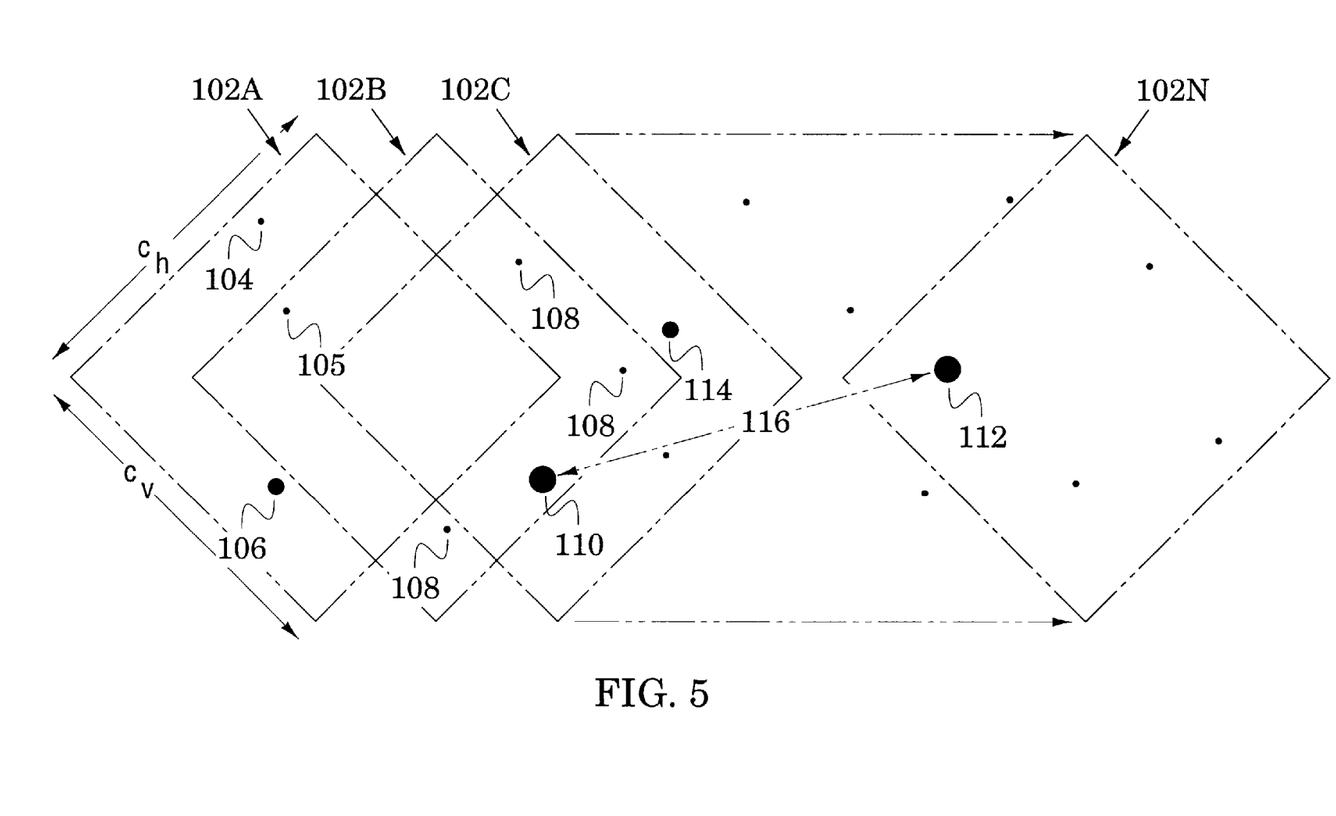
FIG. 5 is another enlarged view of the fields-of-view of FIG. 4A which illustrates process steps in the flow chart of FIG. 3.

FIG. 5 is an enlarged view of FIG. 4 which shows that the field-of-view 102A provides a frame of star-sensor signals at time $t_1$ that denote star positions of dim stars 104 and 105 and a medium-brightness star 106 (the positions are typically in terms of horizontal and vertical coordinates $c_h$ and $c_v$ of respective fields-of-view). The successive field-of-view 102B provides a frame of star-sensor signals at time $t_2$ that denote star positions of the dim star 105 and of additional dim stars 108 and one bright star 110 but fails to provide star-sensor signals corresponding to the dim star 104 nor the medium-brightness star 106.

Temporarily returning to the flow chart 90 of FIG. 3, it is noted that process step 92 estimates spacecraft rotation Δr throughout at least a portion of the time span Δt. It is further noted in FIG. 5 that the dim star 105 would generate a first set of position coordinates at time $t_1$ relative to the field-of-view 102A and a different second set of position coordinates at time $t_2$ relative to the field-of-view 102B. The position change represented by these respective position coordinates results from the spacecraft rotation Δr that occurred in an elapsed time between the times $t_1$ and $t_2$.

Accordingly, one method embodiment of the invention observes a position change of at least one star in at least two selected ones of the successive fields-of-view that differ by an elapsed time and estimates the spacecraft rotation Δr from the position change and the elapsed time. In this embodiment, the elapsed time is preferably long enough (e.g., on the order of one minute) to facilitate estimation of the spacecraft rotation Δr but short enough to keep the relevant measurement stars within a successive field-of-view.

Another method embodiment simply estimates the spacecraft rotation Δr from attitude rate signals that are received from at least one spacecraft gyroscope such as one of the angular velocity sensors 46 of FIG. 2 which may comprise a set of gyroscopes that respectively sense rotation about the spacecraft's roll, pitch and yaw axes (56, 57 and 58 in FIGS. 1 and 4A).

Process step 93 of FIG. 3 processes, with knowledge of the spacecraft rotation Δr, the star-sensor signals into a processed set of star sensor signals that denote star positions across an expanded field-of-view that exceeds any of the successive fields-of-view. In one method embodiment, this processing step is realized by conforming, with knowledge of the spacecraft rotation Δr, star positions in successive stellar fields-of-view to conformed positions that correspond to a common time $t_{cm}$ in the expanded field-of-view.

For example, field-of-view 102B of FIG. 5 provides star-sensor signals at time $t_2$ that denote star positions of the dim star 105, dim stars 108 and the bright star 108 but this field-of-view fails to sense the dim star 104 and the medium-brightness star 106. With knowledge of the spacecraft rotation Δr between the fields-of-view 102A and 102B, however, the position coordinates of these latter stars in the field-of-view 102A can be conformed to conformed position coordinates at time $t_2$ in an extended field-of-view formed by a combination of the fields-of-view 102A and 102B.

This process can be successively continued to field-of-view 102C and on to field-of-view 102N so that all of the stars shown in FIG. 5 have been conformed to conformed position coordinates at a common time $t_{cm}$ (which is the time $t_n$) in an extended field-of-view 120 that is shown in FIG. 4C. FIG. 4B shows an enlarged view of the fields-of-view 102A–N and these fields-of-view are indicated in broken lines in FIG. 4B. The processed set of star-sensor signals now-denote star positions for bright stars 110 and 112, medium-brightness stars 106 and 114 and numerous dim stars which include dim stars 104, 105 and 108 at the common time $t_{cm}$.

Returning again to the flow chart 90 of FIG. 3, it is noted that process step 94 identifies at least a portion of the stars that generated the processed set of star-sensor signals to thereby acquire an initial attitude estimate. The identifying step generally includes a process step of matching the processed set of star-sensor signals to a known set of stars and this, in turn, generally requires that the processed set of star-sensor signals correspond to a predetermined criterion so as to enhance the probability that a match can be realized.

For illustrative purposes, an exemplary criterion is assumed which requires star-sensor signals that correspond to a bright-star pair, the separation of that star pair and a confirming pair of medium-brightness stars. It is apparent in FIG. 5 that the processed set of star-sensor signals corresponding to the extended field-of-view that comprises fields-of-view 102A–N does meet this criterion since it incudes a bright-star pair (110 and 112), the corresponding separation 116 and a pair of medium-brightness stars (106 and 114).

It is noted, however, that various star parameters and parameter combinations (other than the exemplary one of a bright-star pair, the separation of that star pair and a confirming pair of medium-brightness stars) may be used as an identifying criterion in other embodiments of the invention. It is further noted the star catalogs (61 in FIG. 2) may be organized in various ways (e.g., to include star-pair catalogs) in other embodiments of the invention.

With access to the star catalogs, the stellar attitude acquisition system (62 in FIG. 2) should now be able to identify the stars that generated the processed set of star-sensor signals to thereby acquire an initial attitude estimate. The initial attitude estimate follows from the identification because spatial relationships between the horizontal and vertical coordinates of the star sensors (e.g., 44A of FIGS. 1 and 2) and a spacecraft body-centered coordinate system (e.g., comprising pitch, roll and yaw axes) are predetermined and known and spatial relationships between the star sensors and an earth-centered inertial (ECI) coordinate system) follow from the identified stars.

When two or more operational star sensors are used to practice the invention, the estimate of the relative alignments of the sensors may be refined. The determined orientation of one star sensor (e.g., sensor 44A of FIGS. 1 and 2) with respect to ECI, may be used in conjunction with the determined orientation of another star sensor (e.g., sensor 44B of FIGS. 1 and 2) with respect to ECI, to refine the estimate of the relative alignments of the sensors. Although spatial relationships between the star sensors and the spacecraft body were predetermined, these spatial relationships are typically altered by various disturbing sources (e.g., launch vibration, launch shock and thermal distortion). Accordingly, the effects of this alteration can be mitigated with the refined estimates of the sensors' relative alignment.

Although no direct measurement of the spatial relationship between the spacecraft body-centered coordinate system and the ECI coordinate system is available, estimates of this relationship (e.g., the initial attitude estimate described above) and of the spatial relationships between the spacecraft body and the star sensors can be revised to be consistent with the refined estimates of the sensors' relative alignment (also described above). In a method embodiment, this revision is realized by assuming that one of the predetermined spatial relationships between the star sensors and the spacecraft body is accurate and revising the other spatial relationship to be consistent with a refined estimate of the sensors' relative alignment.

The final process step 95 of FIG. 3 responds to the initial attitude estimate by altering the spacecraft attitude with spacecraft torque generators to realize a commanded attitude (e.g., the commanded attitude 78 provided by the attitude and rate command section 68 of FIG. 2).

The teachings of the invention may be practiced in numerous embodiments. For example, although the processes of FIG. 3 can be realized with star-sensor signals that indicate only position coordinates of stars in the field-of-view, the star-sensor signals preferably also indicate star magnitudes. Although the invention can be practiced with a single star sensor as indicated in FIG. 4A, spacecraft attitude accuracy can often be enhanced with multiple star sensors (e.g., two) whose fields-of-view are tilted away from each other. Two exemplary spacecraft embodiments would thus respectively include a) one operational star sensor and a spare backup star sensor and b) two operational star sensors and a spare backup star sensor.

A variety of predetermined criterion can be used in practicing process step 94 of FIG. 3 and one has been exemplified above which requires star-sensor signals that correspond to a bright-star pair, the separation of that star pair and a confirming pair of medium-brightness stars. Corresponding to this exemplary criterion, the matching step referred to above may include an initial process step of identifying candidate star pairs (e.g., from one of the star catalogs 61 of FIG. 2) whose magnitude and separation substantially match the magnitudes and separation of the star pair 110 and 112 of FIG. 5).

In a subsequent step, candidate star pairs are successively discarded if they are not associated (e.g., as determined from the star catalogs) with a pair of stars whose relative positions substantially match those of the confirming pair of the processed set of star-sensor signals. These process steps will generally identify one of the candidate star pair and an associated pair of stars as the stars that generated the processed set of star-sensor signals.

Star sensors are typically limited to a maximum number (e.g., five) of stars that they can simultaneously track. Accordingly, process step 93 of FIG. 3 is preferably practiced by adding newer ones of the star-sensor signals to the processed set of star-sensor signals and, if necessary to avoid exceeding the maximum number, discarding older ones until the identification criterion is satisfied. Newer star-sensor signals are preferred because they do not include conforming inaccuracies contributed by the estimated spacecraft rotation Δr.

The process of discarding older star-sensor signals comprises the step of breaking track on the corresponding stars and this is realized with the tracked-star commands (77 in FIG. 2) which are sent from the stellar attitude acquisition system (62 in FIG. 2) to control which stars are currently tracked by the star sensors. Preferably, tracking is first breaked on stars that are closest to moving off of the current field-of-view (e.g., star 105 in FIG. 5 with respect to field-of-view 102B).

In another method embodiment, the identification criterion described above is modified by requiring that the star-pair separation (116 in FIG. 5) not extend across different fields-of-view. For example, the bright star pair 110 and 112 would not satisfy the criterion unless they were both contained within one of the successive fields-of-view. The accuracy of the observed separation is thus enhanced because it does not require the spacecraft rotation Δr (found in process step 92) for its determination. Accordingly, the probability of success in the identifying step (94 in FIG. 3) is enhanced.

After initial attitude acquisition and control, the attitude of the spacecraft (20 in FIG. 1) can continue to be controlled in accordance with the process steps of FIG. 3. That is, the stellar attitude acquisition system (62 in FIG. 2) can successively obtain attitude estimates and provide them to the attitude determination and controller (66 in FIG. 2). In this embodiment, the tracked-star commands 77 from the stellar attitude acquisition system 62 preferably commands the relevant star sensor to track its maximum number of stars to enhance the probability of matching an imaged star pattern to that of the star catalogs 61.

Alternatively, the star measurement signals 74 from the star data processor 60 of FIG. 2 can be processed by an optimal estimator to provide subsequent attitude estimates 76 whose variance (i.e., inaccuracy) is reduced from the variance of the measurement signals 74. The optimal estimator is the recursive filter system 64 of FIG. 2 which may, for example, be a Kalman filter.

In this embodiment, the attitude determination and controller 66 initially responds to the initial attitude estimate 72 and subsequently responds to the subsequent attitude estimates 76. In this embodiment, the tracked-star commands 77 from the star data processor 60 preferably limits the tracking of the relevant star sensor to less than its maximum number of stars to simplify processing and thus enhance processing speed.

Attitude acquisition and control systems of the present invention substantially increase the field-of-view that can be obtained from star-sensor signals and thus reduce the time required to acquire attitude estimates and enhance the probability of such acquisition.

Although the teachings of the invention can be practiced with a hardware attitude controller, it is preferably realized, at least in part, with one or more suitably-programmed data processors (i.e., the processors 42 of FIG. 1).

The communication system 24 of FIG. 1 has been shown and described to thereby indicate an exemplary requirement for controlling a spacecraft's service attitude. This system is for illustrative purposes only and the teachings of the invention may be applied to realize attitude acquisition and control of any spacecraft.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of obtaining an attitude estimate of a spacecraft, comprising the steps of:
   over a time span Δt, receiving successive frames of star-sensor signals that denote star positions in successive stellar fields-of-view;
   estimating spacecraft rotation Δr throughout at least a portion of said time span Δt;
   in response to said spacecraft rotation Δr, processing said star-sensor signals into a processed set of star-sensor signals that denote star positions across an expanded field-of-view that exceeds any of said successive fields-of-view;
   identifying at least a portion of the stars that generated said processed set of star-sensor signals to thereby acquire an initial attitude estimate.

2. The method of claim 1, further including the steps of:
   providing said star-sensor signals with at least two star sensors that have respective fields-of-view with respective predetermined spatial relationships to said spacecraft; and
   determining said initial attitude estimate from said predetermined spatial relationships.

3. The method of claim 2, wherein said identifying step provides a set of identified stars and said determining step includes the steps of:
   in response to said identified stars and with respect to an earth-centered inertial (ECI) coordinate system, determining respective star-sensor-to-ECI spatial relationships between said star sensors and said ECI system; and
   calculating said initial attitude estimate from said predetermined spatial relationships and said star-sensor-to-ECI spatial relationships.

4. The method of claim 3, further including the step of refining an estimated relative alignment between said star sensors with the aid of said star-sensor-to-ECI spatial relationships.

5. The method of claim 4, further including the step of refining said predetermined spatial relationships with the aid of said star-sensor-to-ECI spatial relationships.

6. The method of claim 1, wherein said estimating step includes the steps of:
   observing a position change of at least one star in at least two fields-of-view that differ by an elapsed time; and
   determining said spacecraft rotation Δr from said position change and said elapsed time.

7. The method of claim 1, wherein said estimating step includes the step of receiving attitude rate signals from at least one spacecraft gyroscope.

8. The method of claim 1, wherein said star-sensor signals also denote star magnitudes.

9. The method of claim 1, wherein said processing step includes the step of conforming, with knowledge of said spacecraft rotation Δr, star positions in said successive stellar fields-of-view to conformed positions that correspond to a common time $t_{cm}$ in said expanded field-of-view.

10. The method of claim 1, further including the step of continuing said processing step until said processed set of star-sensor signals satisfies a predetermined criterion.

11. The method of claim 10, wherein said processing step includes the step of adding newer ones of said star-sensor signals to said processed set of star-sensor signals until said criterion is satisfied.

12. The method of claim 10, wherein said processing step includes the step of replacing, in said processed set of star-sensor signals, older ones of said star-sensor signals with newer ones until said criterion is satisfied.

13. The method of claim 10, wherein said criterion requires star-sensor signals that correspond to a star pair, the separation of said star pair and a confirming pair of stars.

14. The method of claim 13, wherein said separation does not exceed any of said successive fields-of-view.

15. The method of claim 13, further including the step of distinguishing said star pair on the basis of the brightness of its stars.

16. The method of claim 1, wherein said identifying step includes the step of matching said processed set of star-sensor signals to a known set of stars.

17. The method of claim 16, wherein said matching step includes the step of accessing said known set from star catalogs.

18. The method of claim 16, wherein said matching step includes the steps of:

identifying candidate star pairs whose magnitude and separation substantially match the magnitude and separation of a first pair of said processed set of star-sensor signals; and discarding candidate star pairs that are not associated with a pair of stars whose relative positions substantially match a second pair of said processed set of star-sensor signals.

19. The method of claim 18, wherein said matching step includes the step of discarding candidate star pairs whose positions relative to an ECI coordinate system are not consistent with a predetermined attitude estimate.

20. The method of claim 1, further including the step of recursively filtering subsequent frames of star-sensor signals to realize improved subsequent estimates of said initial attitude estimate.

21. A method of controlling the attitude of a spacecraft, comprising the steps of:

over a time span $\Delta t$, receiving successive frames of star-sensor signals that denote star positions in successive stellar fields-of-view;

estimating spacecraft rotation $\Delta r$ throughout at least a portion of said time span $\Delta t$;

in response to said spacecraft rotation $\Delta r$, processing said star-sensor signals into a processed set of star-sensor signals that denote star positions across an expanded field-of-view that exceeds any of said successive fields-of-view;

identifying at least a portion of the stars that generated said processed set of star-sensor signals to thereby acquire an initial attitude estimate; and in response to said initial attitude estimate, altering said attitude, with spacecraft torque generators to realize a commanded attitude.

22. The method of claim 21, further including the steps of:

providing said star-sensor signals with at least two star sensors that have respective fields-of-view with respective predetermined spatial relationships to said spacecraft; and determining said initial attitude estimate from said predetermined spatial relationships.

23. The method of claim 22, wherein said identifying step provides a set of identified stars and said determining step includes the steps of:

in response to said identified stars and with respect to an earth-centered inertial (ECI) coordinate system, determining respective star-sensor-to-ECI spatial relationships between said star sensors and said ECI system; and calculating said initial attitude estimate from said predetermined spatial relationships and said star-sensor-to-ECI spatial relationships.

24. The method of claim 23, further including the step of refining an estimated relative alignment between said star sensors with the aid of said star-sensor-to-ECI spatial relationships.

25. The method of claim 24, further including the step of refining said predetermined spatial relationships with the aid of said star-sensor-to-ECI spatial relationships.

26. The method of claim 21, wherein said estimating step includes the steps of:

observing a position change of at least one star in at least two fields-of-view that differ by an elapsed time; and determining said spacecraft rotation $\Delta r$ from said position change and said elapsed time.

27. A spacecraft, comprising:

a spacecraft body;

at least one star sensor that is coupled with a known spatial relationship to said body;

a torque-generation system that is coupled to said body; and at least one data processor that is programmed to perform the steps of:

a) over a time span $\Delta t$, receiving, from said star sensor, successive frames of star-sensor signals that denote star positions in successive stellar fields-of-view;

b) estimating spacecraft rotation $\Delta r$ throughout at least a portion of said time span $\Delta t$;

c) in response to said spacecraft rotation $\Delta r$, processing said star-sensor signals into a processed set of star-sensor signals that denote star positions across an expanded field-of-view that exceeds any of said successive fields-of-view;

d) identifying at least a portion of the stars that generated said processed set of star-sensor signals to thereby acquire an initial attitude estimate; and e) in response to said initial attitude estimate, altering the attitude of said spacecraft with said torque generation system to realize a commanded attitude.

28. The spacecraft of claim 27, wherein said torque-generation system includes a momentum wheel.

29. The spacecraft of claim 27, wherein said torque-generation system includes a thruster.

30. The spacecraft of claim 27, wherein said spacecraft further includes at least one gyroscope coupled to said body and said estimating step includes the step of receiving attitude rate signals from said gyroscope.

31. The spacecraft of claim 27, further including the steps of:

providing said star-sensor signals with at least two star sensors that have respective fields-of-view with respective predetermined spatial relationships to said spacecraft; and determining said initial attitude estimate from said predetermined spatial relationships.

32. The spacecraft of claim 31, wherein said identifying step provides a set of identified stars and said determining step includes the steps of:

in response to said identified stars and with respect to an earth-centered inertial (ECI) coordinate system, determining respective star-sensor-to-ECI spatial relationships between said star sensors and said ECI system; and calculating said initial attitude estimate from said predetermined spatial relationships and said star-sensor-to-ECI spatial relationships.

33. The spacecraft of claim 32, further including the step of refining an estimated relative alignment between said star sensors with the aid of said star-sensor-to-ECI spatial relationships.

34. The spacecraft of claim 33, further including the step of refining said predetermined spatial relationships with the aid of said star-sensor-to-ECI spatial relationships.

35. The spacecraft of claim 27, wherein said estimating step includes the steps of:

observing a position change of at least one star in at least two fields-of-view that differ by an elapsed time; and determining said spacecraft rotation $\Delta r$ from said position change and said elapsed time.

* * * * *